(12) United States Patent
Gatto et al.

(10) Patent No.: US 7,752,112 B2
(45) Date of Patent: Jul. 6, 2010

(54) SYSTEM AND METHOD FOR USING ANALYST DATA TO IDENTIFY PEER SECURITIES

(75) Inventors: Joseph G Gatto, San Francisco, CA (US); David Lichtblau, Mill Valley, CA (US); Josh Turner, San Francisco, CA (US)

(73) Assignee: StarMine Corporation, San Francisco, CA (US)

( * ) Notice: Subject to any disclaimer, the term of this patent is extended or adjusted under 35 U.S.C. 154(b) by 233 days.

(21) Appl. No.: 11/594,886

(22) Filed: Nov. 9, 2006

(65) Prior Publication Data
US 2008/0114701 A1   May 15, 2008

(51) Int. Cl.
G06Q 40/00   (2006.01)
(52) U.S. Cl. ...................................................... 705/36
(58) Field of Classification Search ................ None
See application file for complete search history.

(56) References Cited

U.S. PATENT DOCUMENTS

| | | | |
|---|---|---|---|
| 3,270,190 A | 8/1966 | Lambert | |
| 4,884,217 A | 11/1989 | Skeirik et al. ............... | 364/513 |
| 4,920,499 A | 4/1990 | Skeirik ....................... | 364/513 |
| 4,965,742 A | 10/1990 | Skeirik ....................... | 364/513 |
| 5,006,992 A | 4/1991 | Skeirik ....................... | 364/513 |
| 5,006,998 A | 4/1991 | Yasunobu et al. .......... | 364/513 |
| 5,132,899 A | 7/1992 | Fox ............................ | 364/408 |
| 5,220,500 A | 6/1993 | Baird et al. ................. | 364/408 |
| 5,365,425 A | 11/1994 | Torma et al. ................ | 364/401 |
| 5,500,795 A | 3/1996 | Powers et al. .............. | 364/401 |
| 5,502,637 A | 3/1996 | Beaulieu et al. ............ | 364/408 |
| 5,557,513 A | 9/1996 | Frey et al. ............... | 364/401 R |
| 5,608,620 A | 3/1997 | Lundgren ................... | 395/201 |

(Continued)

FOREIGN PATENT DOCUMENTS

JP   2000090150 A   3/2000

(Continued)

OTHER PUBLICATIONS

Long, William R.; Investing with John D. Laupenheimer, Massachusetts Investors Trust; Aug. 2, 1998; New York Times; Final Edition; col. 1; p. 7.*

(Continued)

*Primary Examiner*—Alexander Kalinowski
*Assistant Examiner*—Virpi H Kanervo
(74) *Attorney, Agent, or Firm*—Pillsbury Winthrop Shaw Pittman LLP

(57) ABSTRACT

A system and method is provided for identifying peer securities relative to a primary security based, at least in part, on analyst coverage. Peer securities may be identified for the primary security by identifying one or more analysts associated with the primary security, and generating a set of candidate peer securities, each of which are associated with at least one of the primary security's analysts. A set of peer securities may be generated based on a degree of analyst overlap among the candidate peer securities. In some implementations, the set of peer securities may be customizable. Thus, investors, analysts, or other users may compare data for comparable securities based on degrees of overlapping analyst coverage, or the comparable securities may be analyzed in other ways, such as creating a classification system based on degrees of overlapping analyst coverage.

34 Claims, 8 Drawing Sheets

U.S. PATENT DOCUMENTS

| | | | | |
|---|---|---|---|---|
| 5,613,072 | A | 3/1997 | Hammond et al. | 395/204 |
| 5,675,746 | A | 10/1997 | Marshall | 395/235 |
| 5,701,400 | A | 12/1997 | Amado | 395/76 |
| 5,749,077 | A | 5/1998 | Campbell | 705/36 |
| 5,761,442 | A | 6/1998 | Barr et al. | 395/236 |
| 5,774,880 | A | 6/1998 | Ginsberg | 705/36 |
| 5,774,881 | A | 6/1998 | Friend et al. | 705/36 |
| 5,802,518 | A | 9/1998 | Karaev et al. | 707/9 |
| 5,812,988 | A | 9/1998 | Sandretto | 705/36 |
| 5,819,271 | A | 10/1998 | Mahoney et al. | 707/9 |
| 5,845,285 | A | 12/1998 | Klein | 707/101 |
| 5,852,811 | A | 12/1998 | Atkins | 705/36 |
| 5,864,871 | A | 1/1999 | Kitain et al. | 707/104 |
| 5,893,079 | A | 4/1999 | Cwenar | 705/36 |
| 5,909,669 | A | 6/1999 | Havens | 705/11 |
| 5,911,136 | A | 6/1999 | Atkins | 705/36 |
| 5,918,217 | A | 6/1999 | Maggioncalda et al. | 705/36 |
| 5,930,774 | A * | 7/1999 | Chennault | 705/36 R |
| 5,946,666 | A | 8/1999 | Nevo et al. | 705/36 |
| 5,948,054 | A | 9/1999 | Nielsen | 709/200 |
| 5,950,176 | A | 9/1999 | Keiser et al. | 705/37 |
| 5,956,691 | A | 9/1999 | Powers | 705/4 |
| 5,961,598 | A | 10/1999 | Sime | 709/224 |
| 5,963,922 | A | 10/1999 | Helmering | 705/35 |
| 6,012,042 | A | 1/2000 | Black et al. | 705/36 |
| 6,012,043 | A | 1/2000 | Albright et al. | 705/36 |
| 6,021,397 | A | 2/2000 | Jones et al. | 705/36 |
| 6,064,984 | A | 5/2000 | Ferguson et al. | 705/36 |
| 6,064,986 | A | 5/2000 | Edelman | 705/36 |
| 6,073,115 | A | 6/2000 | Marshall | 705/35 |
| 6,078,904 | A | 6/2000 | Rebane | 705/36 |
| 6,078,924 | A | 6/2000 | Ainsbury et al. | 707/101 |
| 6,119,103 | A | 9/2000 | Basch et al. | 705/35 |
| 6,125,355 | A | 9/2000 | Bekaert et al. | 705/36 |
| 6,154,732 | A | 11/2000 | Tarbox | 705/36 |
| 6,208,720 | B1 | 3/2001 | Curtis et al. | 379/114 |
| 6,236,980 | B1 | 5/2001 | Reese | 705/36 |
| 6,253,192 | B1 | 6/2001 | Corlett et al. | 705/36 |
| 6,317,726 | B1 | 11/2001 | O'Shaughnessy | 705/36 |
| 6,370,516 | B1 | 4/2002 | Reese | 705/36 |
| 6,381,635 | B1 | 4/2002 | Hoyer et al. | 709/207 |
| 6,510,419 | B1 | 1/2003 | Gatto | 705/36 |
| 6,606,615 | B1 | 8/2003 | Jennings et al. | 706/45 |
| 6,681,211 | B1 | 1/2004 | Gatto | 705/36 |
| 6,748,389 | B1 | 6/2004 | Cesare et al. | 707/100 |
| 6,792,399 | B1 | 9/2004 | Phillips et al. | 703/2 |
| 7,016,872 | B1 | 3/2006 | Bettis et al. | 705/36 R |
| 7,249,080 | B1 | 7/2007 | Hoffman et al. | 705/36 |
| 7,251,624 | B1 | 7/2007 | Lee et al. | 705/35 |
| 7,539,637 | B2 | 5/2009 | Gatto | 405/36 R |
| 2002/0002524 | A1* | 1/2002 | Kossovsky et al. | 705/36 |
| 2002/0019791 | A1 | 2/2002 | Goss et al. | 705/36 |
| 2002/0022988 | A1 | 2/2002 | Columbus et al. | 705/11 |
| 2002/0077949 | A1* | 6/2002 | Qasem et al. | 705/36 |
| 2002/0082966 | A1 | 6/2002 | O'Brien et al. | 705/36 |
| 2002/0169701 | A1 | 11/2002 | Tarbox et al. | 705/36 |
| 2003/0004766 | A1 | 1/2003 | Sandoval et al. | 705/7 |
| 2003/0018556 | A1* | 1/2003 | Squyres | 705/36 |
| 2003/0023686 | A1 | 1/2003 | Beams et al. | 709/205 |
| 2003/0065600 | A1 | 4/2003 | Terashima et al. | 705/36 |
| 2003/0084059 | A1 | 5/2003 | Kelley et al. | 707/102 |
| 2004/0024656 | A1* | 2/2004 | Coleman | 705/27 |
| 2004/0117286 | A1 | 6/2004 | Charnley, Jr. | 705/36 |
| 2004/0148248 | A1* | 7/2004 | Allen et al. | 705/37 |
| 2004/0172353 | A1 | 9/2004 | Charnley, Jr. | 705/36 |
| 2005/0033807 | A1* | 2/2005 | Lowrance et al. | 709/204 |
| 2005/0049952 | A1* | 3/2005 | Carter | 705/36 |
| 2005/0080695 | A1* | 4/2005 | Gatto | 705/35 |
| 2006/0069635 | A1* | 3/2006 | Ram et al. | 705/37 |
| 2006/0161472 | A1* | 7/2006 | Weild | 705/10 |
| 2006/0178918 | A1 | 8/2006 | Mikurak | 705/7 |
| 2006/0287938 | A1* | 12/2006 | Sherman et al. | 705/35 |
| 2007/0005481 | A1* | 1/2007 | Kedia et al. | 705/37 |
| 2007/0150405 | A1* | 6/2007 | Greenberg et al. | 705/37 |
| 2007/0162365 | A1 | 7/2007 | Weinreb | 705/35 |
| 2007/0162973 | A1* | 7/2007 | Schneier et al. | 726/22 |
| 2007/0282732 | A1* | 12/2007 | Schulman et al. | 705/37 |
| 2008/0120129 | A1 | 5/2008 | Seubert et al. | 705/1 |
| 2009/0299889 | A1* | 12/2009 | Madhavan et al. | 705/35 |

FOREIGN PATENT DOCUMENTS

| | | |
|---|---|---|
| JP | 2004-046454 A | 2/2004 |
| WO | WO 94/06103 | 3/1994 |
| WO | WO 01/80124 A2 | 10/2001 |

OTHER PUBLICATIONS

Ojala, M.; Investment Analyst Reports Online; Feb. 1991; Database; vol. 14; No. 1; pp. 72-77.*

Cox, Raymond A. K.; Kleiman, Robert T.; A Stochastic Model of Superstardom; Evidence from Institutional investor's All-American Research Team; Winter 2000; Review of Financial Economics 9; pp. 43-53.* https://www.investars.com/home.asp, printed Mar. 26, 2001, 5 pages.

"I/B/E/S Active Express", I/B/E/S International Inc., 1999, 2 pages.

Lawrence D. Brown et al., "The Superiority of Analyst Forecasts as Measures of Expectations: Evidence from Earnings", *The Journal of Finance*, vol. XXXIII, No. 1, Mar. 1978, pp. 1-16.

Lawrence D. Brown et al., "The Predictive Value of Interim Reports for Improving Forecasts of Future Quarterly Earnings", *The Accounting Review*, vol. LIV, No. 3, Jul. 1979, pp. 585-591.

Lawrence D. Brown, "Analyst Forecasting Errors and Their Implications for Security Analysis: An Alternative Perspective", *Financial Analysts Journal*, Jan.-Feb. 1996, pp. 40-47.

Lawrence D. Brown et al., "Analysts can Forecast Accurately!" *The Journal of Portfolio Management*, Spring 1980, pp. 31-34.

L. D. Brown et al., "Perspectives on Forecasting Research in Accounting and Finance", *Journal of Forecasting*, vol. 2, 1983, pp. 325-330.

Robert E. Hoskin et al., "Evidence on the Incremental Information Content of Additional Firm Disclosures Made Concurrently with Earnings," *Journal of Accounting Research*, vol. 24 Supplement 1986, pp. 1-32.

Lawrence D. Brown, "Earnings Surprise Research: Synthesis and Perspectives" *Financial Analysts Journal*, Mar./Apr. 1997, pp. 13-19.

Charles M. C. Lee et al., "What is the Intrinsic Value of the Dow?", *The Journal of Finance*, vol. LIV, No. 5, Oct. 1999, pp. 1693-1741.

Charles M. C. Lee, "Market Integration and Price Execution for NYSE-Listed Securities", *The Journal of Finance*, vol. XLVIII, No. 3, Jul. 1993, pp. 1009-1038.

Charles M. C. Lee et al., "Volume, Volatility, and New York Stock Exchange Trading Halts" *The Journal of Finance*, vol. XLIX, No. 1, Mar. 1994, pp. 183-214.

Navin Chopra et al., "Summing Up", *The Journal of Finance*, vol. XLVIII, No. 2, Jun. 1993, pp. 811-812.

Navin Chopra et al., "Yes, Discounts on Closed-End Funds are a Sentiment Index" *The Journal of Finance*, vol. XLVIII, No. 2, Jun. 1993, pp. 801-808.

Charles M. C. Lee et al., "Spreads, Depths, and the Impact of Earnings Information: An Intraday Analysis", *The Review of Financial Studies*, vol. 6, No. 2, 1993, pp. 345-374.

Sati P. Bandyopadhyay et al., "Analysts' Use of Earnings Forecasts in Predicting Stock Returns: Forecast Horizon Effects", *International Journal of Forecasting*, vol. 11, No. 3, 1995, pp. 429-445.

Lawrence D. Brown, "Influential Accounting Articles, Individuals, Ph.D. Granting Institutions and Faculties: A Citational Analysis", *Accounting, Organizations and Society*, vol. 21; No. 7/8, Oct./Nov./ 1996, pp. 723-754.

Lawrence D. Brown et al., "Security Analyst Superiority Relative to Univariate Time-Series Models in Forecasting Quarterly Earnings", *Journal of Accounting and Economics*, vol. 9, 1987, pp. 159-193.

Lawrence D. Brown et al., "An Evaluation of Alternative Proxies for the Market's Assessment of Unexpected Earnings", *Journal of Accounting and Economics*, vol. 9, 1987, pp. 159-193.

Lawrence D. Brown et al., "The Impact of Annual Earnings Announcements on Convergence of Beliefs", *The Accounting Review*, vol. 67, No. 4, Oct. 1992, pp. 862-875.

Lawrence D. Brown, "Analyst Forecasting Errors: Additional Evidence", *Financial Analysts Journal*, Nov./Dec. 1997, pp. 81-88.

Praveen Sinha et al., "A Re-Examination of Financial Analysts Differential Earnings Forecast Accuracy", *Contemporary Accounting Research*, The Journal of Canadian Academic Accounting Association, vol. 14, No. 1, Spring 1997, pp. 1-42.

Leonard C. Soffer et al., "Post-Earnings Announcement Drift and the Dissemination of Predictable Information", *Contemporary Accounting Research*, The Journal of Canadian Academic Accounting Association, vol. 16, No. 2, Summer 1999, pp. 305-331.

Jacob K. Thomas, "Discussion of "Post-Earnings Announcement Drift and the Dissemination of Predictable Information, *Contemporary Accounting Research*, The Journal of Canadian Academic Accounting Association, vol. 16, No. 2, Summer 1999, pp. 333-340.

Lawrence D. Brown, "Comment on "Post-Earnings Announcement Drift and the Dissemination of Predictable Information"", *Contemporary Accounting Research*, The Journal of Canadian Academic Accounting Association, vol. 16, No. 2, Summer 1999, pp. 341-345.

Lawrence D. Brown et al., "Univariate Time-Series Models of Quarterly Accounting Earnings per Share: A Proposed Model", *Journal of Accounting Research*, vol. 17, No. 1, Spring 1979, pp. 179-189.

Lawrence D. Brown, "Earnings Forecasting Research: Its Implications for Capital Markets Research", *International Journal of Forecasting*, vol. 9, 1993, pp. 295-320.

J. O'Hanlon, "Commentary on: Lawrence D. Brown "Earnings Forecasting Research: Its Implications for Capital Markets Research"", *International Journal of Forecasting*, vol. 9, 1993, pp. 321-323.

Jacob K. Thomas, "Comments on 'Earnings Forecasting Research: Its Implications for Capital Markets Research'", *International Journal of Forecasting*, vol. 9, 1993, pp. 325-330.

Philip Brown, "Comments on 'Earnings Forecasting Research: Its Implications for Capital Markets Research'", *International Journal of Forecasting*, vol. 9, 1993, pp. 331-335.

Mark E. Zmijewski, "Comments on 'Earnings Forecasting Research: Its Implications for Capital Markets Research' by L. Brown", *International Journal of Forecasting*, vol. 9, 1993, pp. 337-342.

Lawrence D. Brown, "Reply to Commentaries on Earnings Forecasting Research: Its Implications for Capital Markets Research", *International Journal of Forecasting*, vol. 9, 1993, pp. 343-344.

Lawrence D. Brown, "A Test of the Reliability of Current Cost Disclosures", *ABACUS—A Journal of Accounting, Finance and Business Studies*, vol. 30, No. 1, Mar. 1994, pp. 2-17.

Lawrence D. Brown, "The Impact of Announcement Timing on the Informativeness of Earnings and Dividends", *Journal of Accounting, Auditing & Finance*, vol. 9, No. 4, Fall 1994, pp. 653-674.

Lawrence D. Brown et al., "The Familiarity with and Perceived Quality of Accounting Journals: Views of Senior Accounting Faculty in Leading U.S. MBA Programs", *Contemporary Accounting Research*, The Journal of Canadian Academic Accounting Association, vol. 11, No. 1-I, Summer 1994, pp. 223-250.

Adrian P. Fitzsimons, et al., "Harmonizing GAAP Differences Among the NAFTA Countries", *The CPA Journal*, May 1995, pp. 43-44.

Lawrence D. Brown, Book Review of M. Metcalf's 1995 *Forecasting Profit'*, *International Journal of Forecasting*, vol. 12, No. 1, 1996, pp. 176-177.

Lawrence D. Brown et al., "An Information Interpretation of Financial Analyst Superiority in Forecasting Earnings", *Journal of Accounting Review*, vol. 25, No. 1, Spring 1997, pp. 49-67.

Lawrence D. Brown, "Forecast Selection When All Forecasts are not Equally Recent", *International Journal of Forecasting*, vol. 7, No. 3, 1991, pp. 349-356.

Lawrence D. Brown et al., "Capsules and Comments", *Journal of Accounting Research*, vol. 29, No. 2, Autumn 1991, pp. 382-385.

Lawrence D. Brown et al., "Applying Citation Analysis to Evaluate the Research Contributions of Accounting Faculty and Doctoral Programs", *The Accounting Review*, vol. LX, No. 2, Apr. 1985, pp. 262-277.

Lawrence D. Brown, "Can ESP Yield Abnormal Returns?", *The Journal of Portfolio Management*, vol. 23, No. 4, Summer 1997, pp. 36-43.

Lawrence D. Brown et al., "Do Stock Prices Fully Reflect the Implications of Current Earnings for Future Earnings for *ARI* Firms?", *Journal of Accounting Research*, vol. 38, No. 1, Spring 2000, pp. 149-164.

Lawrence D. Brown et al., "The Association Between Nonearnings Disclosures by Small Firms and Positive Abnormal Returns", *The Accounting Review*, vol. 68, No. 3, Jul. 1993, pp. 668-680.

Lawrence D. Brown et al., "Adaptive Expectations, Time-Series Models, and Analysis Forecast Revision", *Journal of Accounting Research*, vol. 17, No. 2, Autumn 1979, pp. 341-351.

Lawrence D. Brown et al., "Does the FASB Listen to Corporations?", *Journal of Business Finance & Accounting*, vol. 19, No. 5, Sep. 1992, pp. 715-731.

Lawrence D. Brown et al., "Using Citation Analysis to Assess the Impact of Journals and Articles on Contemporary Accounting Research (CAR)", *Journal of Accounting Research*, vol. 23, No. 1, Spring 1985, pp. 84-109.

Kaushik I. Amin et al., "Option Trading, Price Discovery, and Earnings News Dissemination", *Contemporary Accounting Research*, The Journal of Canadian Academic Accounting Association, vol. 14, No. 2, Summer 1997, pp. 153-192.

Charles M. C. Lee at al., "Investor Sentiment and the Closed-End Fund Puzzle" *The Journal of Finance*, vol. XLVI, No. 1, Mar. 1991, pp. 75-109.

Carolyn M. Callahan et al., "Accounting Information and Bid-Ask Spreads", *Accounting Horizons*, vol. 11, No. 4, Dec. 1997, pp. 50-60.

Charles M. C. Lee, "Accounting-Based Valuation: Impact on Business Practices and Research", *Accounting Horizons*, vol. 13, No. 4, Dec. 1999, pp. 413-425.

Richard Frankel et al., "Accounting Valuation, Market Expectation, and Cross-Sectional Stock Returns", *Journal of Accounting and Economics*, vol. 25, No. 3, Jun. 1998, pp. 283-319.

Ronald King et al., "Corporate Disclosure and Price Discovery Associated with NYSE Temporary Trading Halts", *Contemporary Accounting Research*, The Journal of Canadian Academic Accounting Association, vol. 8, No. 2, Spring 1992, pp. 509-531.

Charles M. C. Lee, "Discussion of "Corporate Disclosure and Price Discovery Associated with NYSE Temporary Trading Halts"", *Contemporary Accounting Research*, The Journal of Canadian Academic Accounting Association, vol. 8, No. 2, Spring 1992, pp. 532-539.

Charles M. C. Lee, "Measuring Wealth", *CA Magazine*, Apr. 1996, pp. 32-37.

Charles M. C. Lee et al., "Inferring Trade Direction from Intraday Data", *The Journal of Finance*, vol. XLVI, No. 2, Jun. 1991, pp. 733-746.

Charles M. C. Lee et al., "Price Momentum and Trading Volume", *The Journal of Finance*, vol. LV, No. 5, Oct. 2000, pp. 2017-2069.

Charles M. C. Lee et al., "Valuing the Dow: A Bottom-Up Approach", *Financial Analysts Journal*, vol. 55, No. 5, Sep./Oct. 1999, pp. 4-23.

Charles M. C. Lee, "Earnings News and Small Traders", *Journal of Accounting and Economics*, vol. 15, No. 2/3, Jun./Sep. 1992, pp. 265-302.

Terry D. Warfield et al., "Response to the FASB Exposure Draft, "Proposed Statement of Financial Accounting Standards—Accounting for Transfers and Servicing of Financial Assets and Extinguishment of Liabilities"", *Accounting Horizons*, vol. 10, No. 3, Sep. 1996, pp. 178-181.

Terry D. Warfield et al., "Response to the FASB Exposure Draft, "Proposed Statement of Financial Accounting Standards—Accounting for Certain Liabilities Related to Closure or Removal of Long-Lived Assets"", *Accounting Horizons*, vol. 10, No. 4, Dec. 1996, pp. 137-141.

Terry D. Warfield et al., "Response to the FASB Exposure Draft, "Proposed Statement of Financial Accounting Standards—Consolidated Financial Statements: Policy and Procedures"", *Accounting Horizons*, vol. 10, No. 3, Sep. 1996, pp. 182-185.

Lawrence D. Brown et al., "Profiting from Predicting Earnings Surprise" *The Journal of Financial Statement Analysis*, Winter 1998, pp. 57-66.

Martin M. Herzberg et al., "Enhancing Earnings Predictability Using Individual Analyst Forecasts", *The Journal of Investing*, Summer 1999, pp. 15-24.

Susan D. Krische et al., "The Information Content of Analyst Stock Recommendations", First Draft: Aug. 8, 2000, Current Draft: Sep. 25, 2000, 40 pages.

www.findarticles.com/m4PRN/1999_Oct_14/56284107/pl/article.jhtml, printed Feb. 5, 2001, 2 pages.

http://my.zacks.com/?ALERT=www.zacks.com, printed Feb. 2, 2001, 6 pages.

http://www.cianet.com/, printed Feb. 5, 2001, 14 pages.

http://www.factset.com/, printed Feb. 5, 2001, 10 pages.

http.www.iexchange.com/, printed Feb. 5, 2001, 50 pages.

http://www.validea.com/home/home.asp, printed Feb. 5, 2001, 26 pages.

http://www.bulldogresearch.com/default.asp, printed Feb. 5, 2001, 28 pages.

Lawrence D. Brown, "Predicting Individual Analyst Earnings Forecast Accuracy", Sep. 29, 1999, pp. 1-60.

Brown et al., "Composite Analyst Earnings Forecasts: The Next Generation", *Journal of Business Forecasting*, Summer 1990, vol. 9, Issue 2.

Ho et al., "Market Reactions to Messages from Brokerage Ratings Systems", *Financial Analysts Journal*, Feb. 1998, vol. 54, Issue 1.

Lamonica, "The Best and Worst: Bloomberg's Second Annual Analysts Survey, and the Top Analysts Top Picks", Financial World, Jan. 30, 1996, vol. 165, Issue 2.

http://interactive.wsj.com/public/current/summaries/best00.htm (Jan. 5, 2001).

http://interactive.wsj.com/public/current/articles/SB963945297966625438.htm (Jan. 5, 2001).

http://interactive.wsj.com/public/current/articles/SB963945742428637569.htm (Jan. 5, 2001).

http://interactive.wsj.com/public/current/articles/SB963945478117361937.htm (Jan. 5, 2001).

http://interactive.wsj.com/public/current/articles/SB963944657420928118.htm (Jan. 5, 2001).

http://interactive.wsj.com/public/current/articles/SB963945615772798263.htm (Jan. 5, 2001).

Herzberg et al., "Enhancing Earnings Predictability Using Individual Analyst Forecasts" *The Journal of Investing*, Summer 1999.

Charles Schwab: Schwab Introduces Analytics Funds; Utilizes Quantitative Techniques to Seek Above-Market Returns.

Mozes et al., "Modeling Earnings Expectations Based on Clusters of Analyst Forecasts", *The Journal of Investing*, Spring 1999.

The Hulbert Financial Digest, Jan. 20, 2000, vol. XX, No. 5, 11 pages.

De Aenlle, Conrad, "Short-Sellers' Puzzle: Not Whether, but Which?", *International Herald Tribune*, Feb. 12, 1994, 2 pages.

White, Ron, "How Computers Work, Fourth Edition", Que Corporation, Sep. 1998, pp. 159 and 42-49 (12 pages).

Downes, John, "Dictionary of Finance and Investment Terms, Sixth Edition", Barron's Educational Series, Inc., 2003, pp. 594, 674, and 678 (5 pages).

"Dictionary of Business", Peter Collin Publishing, Credo Reference, Capitalization, 2001, 1 page.

"The Motley Fool", The Record, Bergen County, NJ, May 30, 1999, pp. b.03, (2 pages).

"Dow Jones Global Titans Indexes", Dow Jones & Company, Dec. 17, 2000, 1 page.

Unknown, Quote.com, Inc., May 7, 1998, http://web.archive.org/web/20000701-1996010re_http://www.quote.com, 2 pages.

Unknown, Webster's New World Computer Dictionary, definition of "logarithmic graph", http://www.credoreference.com/entry.do?pp=1&id=3484634&secid=., © 2003, Wiley Publishing, Inc., 1 page.

Unknown, Academic Press Dictionary of Science and Technology, definition of "logarithmic scale", http://www.credoreference.com/entry.do?pp=1&id=3124817&secid=., © 1992, Academic Press., 1 page.

Ross, Stephen A., et al., "Fundamentals of Corporate Finance", Third Edition, ©1995, Richard D. Irwin, Inc., pp. 332-357.

Ross, Stephen A., et al., "Fundamentals of Corporate Finance", Third Edition, © 1995, Richard D. Irwin, Inc., pp. O-8 through O-14.

Bodie, Zvi, et al., "Investments", Third Edition, © 1996, Richard D. Irwin, Inc., pages are the inside front and back covers, p. Nos. 1-4 were added, 6 pages.

Davis, Mark, "Trying to Find the Newsletter That's Right for You can be Daunting", *Buffalo News*, Mar. 2, 1999 (p. A7), 3 pages.

Hagstrom, Jr., Robert G., "The Warren Buffet Way; Investment Strategies of the World's Greatest Investor", © 1995, John Wiley & Sons, Inc., p. 4.

Lobo et al., "Analysts' Utilization of Historical Earnings Information", *Managerial and Decision Economics*, vol. 12, Oct. 1991, pp. 383-393.

* cited by examiner

Sector Comparison (North America)
⸺ 102

| Sector Name | Industries | Total Stocks |
|---|---|---|
| Industrials | 13 | 642 |
| Materials | 5 | 529 |
| Financials | 7 | 1068 |
| 110 {Information Technology | 8 | 974 |
| Consumer Staples | 6 | 220 |
| Telecom Services | 2 | 154 |
| Health Care | 4 | 745 |
| Utilities | 5 | 162 |
| Consumer Discretionary | 12 | 828 |
| Energy | 2 | 530 |

Column markers: 104 (Sector Name), 106 (Industries), 108 (Total Stocks)

Industries within the Information Technology Sector (

| Industry Name | Total Stocks |
|---|---|
| Semiconductors | 175 |
| Internet Software & Serv | 137 |
| Software | 199 |
| Electronic Instruments | 148 |
| IT Services | 106 |
| Office Electronics | 5 |
| 116 {Computers & Peripherals | 71 |
| Communications Equip | 133 |

Column markers: 112 (Industry Name), 114 (Total Stocks)

Fig. 1

Criteria Used:
220 — Market Cap (MM $US) > 5000
Countries Used:
United States — 218
Industries Used: 216
210 — Information Technology: Computers & Peripherals
Viewing 1-12 of 12

| Ticker | Company Name ▲ |
|---|---|
| 222 — AAPL | Apple Computer Incorporated |
| DELL | Dell Inc |
| EMC | EMC Corporation Mass |
| FJTSY | Fujitsu Limited |
| HPQ | Hewlett Packard Co |
| IBM | International Business Machines |
| 224 { NIPNY | Nec Corp |
| NTAP | Network Appliance Inc |
| SNDK | Sandisk Corporation |
| STX | Seagate Technology |
| SUNW | Sun Microsystems Inc |
| TOSBF | Toshiba Corp |

Fig.2

Peer Candidates for AAPL

| Include as Peer | Ticker | Company Name | Coverage Overlap▼ | Market Cap ($US) | P/E Smart Estimate F12M | Industry | Security Country |
|---|---|---|---|---|---|---|---|
| | AAPL | Apple Computer Incorporated | 25 | 52,453 | 25.6 | Computers & Peripherals | United States |
| ✓ | HPQ | Hewlett Packard Co | 19 | 94,865 | 16.2 | Computers & Peripherals | United States |
| ✓ | DELL | Dell Inc | 19 | 69,833 | 18.0 | Computers & Peripherals | United States |
| ✓ | SUNW | Sun Microsystems Inc | 16 | 16,336 | - | Computers & Peripherals | United States |
| ✓ | LXK | Lexmark International Inc | 14 | 4,981 | 15.0 | Computers & Peripherals | United States |
| ✓ | IBM | International Business Machines | 13 | 131,357 | 14.1 | Computers & Peripherals | United States |
| ✓ | EMC | EMC Corporation Mass | 12 | 33,370 | 20.7 | Computers & Peripherals | United States |
| ✓ | NTAP | Network Appliance Inc | 11 | 12,924 | 34.4 | Computers & Peripherals | United States |
| ☐ | GTW | Gateway Incorporated | 10 | 905 | 15.6 | Computers & Peripherals | United States |
| ☐ | XRX | Xerox Corporation | 6 | 14,119 | 14.4 | Office Electronics | United States |
| ☐ | STX | Seagate Technology | 6 | 12,158 | 11.2 | Computers & Peripherals | United States |
| ☐ | CDWC | Cdw Corp | 5 | 4,663 | 17.0 | Electronic Equipment & Instruments | United States |
| ☐ | WDC | Western Digital Corp | 5 | 4,165 | 11.5 | Computers & Peripherals | United States |
| ☐ | IM | Ingram Micro | 5 | 3,207 | 12.5 | Electronic Equipment & Instruments | United States |
| ☐ | TECD | Tech Data Corp | 5 | 2,009 | 17.3 | Electronic Equipment & Instruments | United States |
| ☐ | QLGC | QLogic Corporation | 4 | 3,140 | 23.4 | Computers & Peripherals | United States |
| ☐ | MXO | Maxtor Corporation | 4 | 2,339 | - | Computers & Peripherals | United States |
| ☐ | MSFT | Microsoft Corp | 3 | 286,648 | 18.9 | Software | United States |
| ☐ | EK | Eastman Kodak Co | 3 | 8,412 | 20.3 | Leisure Equipment & Products | United States |
| ☐ | BRCD | Brocade Communications Systems | 3 | 1,764 | 22.5 | Computers & Peripherals | United States |
| ☐ | EFII | Electronics For Imaging Inc | 3 | 1,511 | 20.0 | Computers & Peripherals | United States |
| ☐ | ELX | Emulex Corporation | 3 | 1,451 | 14.7 | Computers & Peripherals | United States |
| ☐ | CSCO | Cisco Sys Inc | 2 | 131,683 | 18.5 | Communications Equipment | United States |
| ☐ | INTC | Intel Corporation | 2 | 116,366 | 17.8 | Semiconductors & Semiconductor Equipment | United States |
| ☐ | ADBE | Adobe Systems Inc | 2 | 21,803 | 26.9 | Software | United States |
| ☐ | AMD | Advanced Micro Devices Inc | 2 | 16,562 | 21.6 | Semiconductors & Semiconductor Equipment | United States |
| ☐ | RIMM | Research In Motion | 2 | 16,139 | 25.9 | Communications Equipment | United States |
| ☐ | MRVL | Marvell Technology Group | 2 | 15,690 | 29.5 | Semiconductors & Semiconductor Equipment | United States |
| ☐ | JNPR | Juniper Networks Inc | 2 | 10,897 | 22.1 | Communications Equipment | United States |
| ☐ | PBI | Pitney Bowes Inc | 2 | 9,629 | 15.1 | Commercial Services & Supplies | United States |
| ☐ | VRSN | Verisign Inc | 2 | 5,728 | 22.9 | Internet Software & Services | United States |
| ☐ | LOGI | Logitech International | 2 | 3,791 | 19.5 | Computers & Peripherals | United States |
| ☐ | FDRY | Foundry Networks Inc. | 2 | 2,288 | 28.4 | Communications Equipment | United States |
| ☐ | PALM | Palm Inc | 2 | 2,018 | 21.9 | Computers & Peripherals | United States |
| ☐ | AVID | Avid Technology Incorporated | 2 | 1,811 | 15.1 | Computers & Peripherals | United States |
| ☐ | KOMG | Komag Inc | 2 | 1,470 | 10.9 | Computers & Peripherals | United States |
| ☐ | RACK | Rackable Systems Inc | 2 | 1,128 | 54.5 | Computers & Peripherals | United States |
| ☐ | MVSN | Macrovision Corporation | 2 | 1,112 | 22.3 | Software | United States |
| ☐ | NCR | NCR Corporation | 2 | 714 | 19.7 | Computers & Peripherals | United States |
| ☐ | SYNA | Synaptics Inc. | 2 | 558 | 22.9 | Computers & Peripherals | United States |
| ☐ | SNX | Synnex Corp | 2 | 543 | 12.0 | Electronic Equipment & Instruments | United States |
| ☐ | MCDTA | Mcdata Corp | 2 | 522 | 14.9 | Computers & Peripherals | United States |

Note: Coverage Overlap for a security reflects the number of analysts who cover AAPL and also cover the selected security.

Fig.5b

Peer Candidates for PEET

[Update & Save]

| Include as Peer | Ticker | Company Name | Coverage Overlap ▼ | Market Cap ($US) | P/E Smart Estimate F12M | Industry |
|---|---|---|---|---|---|---|
| | PEET | Peet's Coffee & Tea Inc | 7 | 407 | 41.3 | Food Products |
| ☑ | SBUX | Starbucks Corp | 4 | 27,695 | 46.9 | Hotels Restaurants & Leis |
| ☑ | SONC | Sonic Corp | 3 | 1,962 | 23.9 | Hotels Restaurants & Leis |
| ☑ | PFCB | Pf Chang's China Bistro Inc | 3 | 1,270 | 32.9 | Hotels Restaurants & Leis |
| ☑ | BJRI | Bj's Restaurants Inc | 3 | 580 | 56.0 | Hotels Restaurants & Leis |
| ☑ | MSSR | Mccormick & Schmicks Seafood Re | 3 | 328 | 26.0 | Hotels Restaurants & Leis |
| ☑ | CAKE | Cheesecake Factory Inc | 2 | 2,892 | 31.2 | Hotels Restaurants & Leis |
| ☑ | PNRA | Panera Bread Co | 2 | 2,290 | 35.8 | Hotels Restaurants & Leis |
| ☐ | RARE | Rare Hospitality Intl Inc | 2 | 1,142 | 19.8 | Hotels Restaurants & Leis |
| ☐ | FLWS | 1-800-Flowers.Com Inc | 2 | 185 | 28.5 | Internet & Catalog Retail |
| ☐ | REDE | Redenvelope Inc | 2 | 88 | - | Internet & Catalog Retail |
| ☐ | PSTA | Monterey Gourmet Foods Inc | 1 | 63 | 33.5 | Food Products |

Fig.5c

Peer Candidates for SBUX

| Include as Peer | Ticker | Company Name | Coverage Overlap ▼ | Market Cap ($US) | P/E Smart Estimate F12M | Industry | Security Country |
|---|---|---|---|---|---|---|---|
| | SBUX | Starbucks Corp | 17 | 27,695 | 46.9 | Hotels Restaurants & Leisure | United States |
| ☑ | CAKE | Cheesecake Factory Inc | 12 | 2,892 | 31.2 | Hotels Restaurants & Leisure | United States |
| ☑ | EAT | Brinker International | 10 | 3,650 | 18.0 | Hotels Restaurants & Leisure | United States |
| ☑ | PFCB | Pf Chang's China Bistro Inc | 10 | 1,270 | 32.9 | Hotels Restaurants & Leisure | United States |
| ☑ | DRI | Darden Restaurants Inc | 9 | 6,242 | 17.7 | Hotels Restaurants & Leisure | United States |
| ☑ | MCD | McDonalds Corp | 8 | 43,857 | 15.7 | Hotels Restaurants & Leisure | United States |
| ☑ | YUM | Yum! Brands Inc | 8 | 13,689 | 17.3 | Hotels Restaurants & Leisure | United States |
| ☑ | WEN | Wendys Intl Inc | 8 | 7,316 | 26.6 | Hotels Restaurants & Leisure | United States |
| ☐ | OSI | Outback Steakhouse Inc | 7 | 3,287 | 22.3 | Hotels Restaurants & Leisure | United States |
| ☐ | APPB | Applebees International Inc | 6 | 1,831 | 18.5 | Hotels Restaurants & Leisure | United States |
| ☐ | PNRA | Panera Bread Co | 5 | 2,290 | 35.8 | Hotels Restaurants & Leisure | United States |
| ☐ | SONC | Sonic Corp | 5 | 1,962 | 23.9 | Hotels Restaurants & Leisure | United States |
| ☐ | CMG | Chipotle Mexican Grill Inc | 5 | 1,692 | 68.7 | Hotels Restaurants & Leisure | United States |
| ☐ | RRGB | Red Robin Gourmet Burgers | 5 | 738 | 24.2 | Hotels Restaurants & Leisure | United States |
| ☐ | MSSR | Mccormick & Schmicks Seafood Re | 5 | 328 | 26.0 | Hotels Restaurants & Leisure | United States |
| ☐ | CPKI | California Pizza Kitchen | 4 | 593 | 25.3 | Hotels Restaurants & Leisure | United States |
| ☐ | KKD | Krispy Kreme Doughnuts Inc | 4 | 562 | - | Hotels Restaurants & Leisure | United States |
| ☐ | RUTH | Ruth's Chris Steak House | 4 | 501 | 24.4 | Hotels Restaurants & Leisure | United States |
| ☐ | PEET | Peet's Coffee & Tea Inc | 4 | 407 | 41.3 | Food Products | United States |

Fig.5d

SYSTEM AND METHOD FOR USING ANALYST DATA TO IDENTIFY PEER SECURITIES

FIELD OF THE INVENTION

The invention relates generally to a computer-implemented system and method for using analyst data to identify peer securities relative to a primary security, and in particular, to comparing and/or classifying securities based on similarities derived from degrees of overlap in analyst coverage.

BACKGROUND OF THE INVENTION

When conducting investment research, it is often desirable to compare financial data for similar securities to better inform decision making. For example, investors may desire to compare market capitalizations, price to earning ratios, cash flow, operating efficiencies, projected growth, or other information for similar securities in order to determine whether to buy, sell, hold, or take some other action with respect to one or more securities. This type of analysis, often referred to as comparable analysis or peer analysis, is sometimes provided as a service of Financial Information Products that deliver news and financial data to clients.

As an example, one method of identifying peers relative to a given security provides users with manual control over peer identification. For example, a user may manually enter ticker symbols for securities to be compared into a Financial Information Product interface. Data for the specified ticker symbols may be retrieved, and the data may be displayed side-by-side (or according to some other configuration) in the interface for the user to view and analyze. One disadvantage of this method, however, is that investors may not be aware of all sectors, industries, business models, and other information for potentially thousands of securities, and the securities must be filtered and identified manually. This introduces other disadvantages, such as a greater likelihood of error, as investors may mistakenly believe securities are related or unrelated, or the investors may not be aware of all potentially relevant securities. For example, error may occur because manual peer identification may be over-inclusive (e.g., securities in similar sectors may have distinct products lines that do not compete in the marketplace) or under-inclusive (e.g., securities may be left out because an investor is unaware of a comparable security).

Another method of peer identification relies upon third-party classification schemes such as the Global Industry Classification System (as provided by Morgan Stanley Capital International and Standard & Poor's), the Financial Times Stock Exchange scheme, offerings by Dow Jones, and others. Generally, these schemes tend to organize securities by mapping each security into a hierarchy based on various factors, such as region, sector, industry, or other criteria. For example, the Global Industry Classification System organizes securities hierarchically according to one or more regions, where each region includes one or more sectors, each sector includes one or more industries, and each industry includes one or more securities. In some instances, an industry may also include one or more sub-industries. While these classification schemes are able to sort a large number of securities into generally related categories, the hierarchy of securities may be inconsistent from one scheme to another, potentially leaving certain securities out of a comparison analysis. Moreover, securities may be placed into the same category because their products and/or services are marketed in facially similar industries, even though those products and/or services satisfy different niches in the marketplace.

Referring to FIG. 1, an exemplary illustration of peer identification is provided using the Global Industry Classification System. Those skilled in the art will recognize that the specific names, organization, mapping of securities, or other criteria is exemplary only and may change from time to time. The Global Industry Classification System may be organized according to a region 102 (e.g., North America), and every security within a region 102 may be categorized within a Sector 104 (e.g., a particular security may be an Industrial, Material, Financial, Information Technology, Consumer Staple, Telecom Service, Health Care, or other type of security). Each Sector 104 may include one or more Industries 106 and one or more Total Stocks 108. For example, within North America, an Information Technology Sector 110 may include eight Industries 106 and nine hundred seventy-four Total Stocks 108. If an investor is interested in researching comparable securities selects Information Technology Sector 110, the investor may be presented with Industries 112 in the Information Technology Sector (e.g., Semiconductors, Internet Software and Services, Software, or others), each of which may include a number of Total Stocks 114. The investor may be particularly interested in Computers & Peripherals 116, which may include seventy-one Total Stocks 114. However, it may be difficult to perform meaningful comparable analysis across seventy-one securities. Thus, existing Financial Information Products may allow the investor to create, edit, and store lists of securities by selecting one or more Sectors 104 and/or Industries 112, and further limiting, screening, or filtering the number of securities by setting various criteria.

Referring to FIG. 2, a Financial Information Product may enable an investor or other user to create, edit, and store lists of securities based on criteria such as market capitalization, growth rate, price to earnings ratio, and/or other screening criteria. This may enable comparative analysis of securities meeting the screening criteria by displaying or otherwise presenting data for the securities and/or aggregate information for the securities. For example, an investor interested in peers for Apple Computer Inc. (AAPL) may set screening criteria to limit a search to securities listed in the United States 218 within Information Technology Sector 210 and Computer & Peripherals Industry 216 with a market capitalization 220 of greater than $5 billion. The search may return a set of results including AAPL 222, as well as eleven other securities 224 for comparison.

While these results provide a reasonable comparison, the results may vary from one classification system to another, screening criteria may vary from one security to another, and the results may include comparables that are not true peers of a primary security. For example, SanDisk Corp. (SNDK) is listed among securities 224 identified as comparable to AAPL 222 because SNDK is classified within Computers & Peripherals 216. However, SNDK designs, develops, and markets flash storage card products used in a variety of consumer electronics, whereas AAPL primarily designs, develops, and markets consumer electronic devices such as personal computers and portable music players, as well as digital downloads. Thus, a financial analyst may find that SNDK is not a good peer of AAPL because their products fulfill different roles in the market. On the other hand, a financial analyst may find that CDW Corp. (CDWC) and Xerox Corp. (XRX) are good comparables for AAPL because they sell similar products to consumers. However, screening methods based on an existing system such as the Global Industry Classification System would not return CDWC or XRX as comparables because CDWC is classified within the Services Sector and Retail Industry and XRX is classified within the Office Equipment Industry.

Existing comparative investment research systems that identify peers suffer from these and other drawbacks.

SUMMARY OF THE INVENTION

The invention addressing these and other drawbacks of existing systems relates to a system and method for using analyst data (e.g., security analysts) to identify peer securities relative to a primary security. The identification of peer securities may be based, at least in part, on degrees of overlap in analyst coverage. The identified peer securities may be used for, among other things, comparing data for similar securities, creating a classification system for a set or sets of securities, generating comparisons across multiple peer sets for one or more primary securities, or many other security research tasks.

According to various aspects of the invention, peer securities may be identified based, at least in part, on degrees of overlap in broker or financial analyst coverage. For example, two securities may be considered related, and therefore identified as peers, based on criteria associated with analysts that cover the two securities (e.g., based on a number of analysts associated with both a primary security and one or more other securities). A user may identify peer securities, and may compare data for the peer securities to inform investment decision-making, among other uses.

By using degrees of overlap in analyst coverage to identify sets of peer securities, the invention overcomes drawbacks of existing systems by identifying peers as related because analysts tend to specialize or focus research in particular areas. Whereas a broad sector or industry may contain hundreds of securities, an analyst may only cover a relatively small number of securities (e.g., on an order of ten to twelve securities), and therefore the analyst may become a specialist in a particular set of securities. Analysts may tend to look at similar factors from one covered security to another, and therefore the invention utilizes degrees of overlap in analyst specialties (coverage) to identify a set of peer securities for a primary security.

For example, within a single Sector or Industry, there may be many different sub-Industries, business models, product lines, market roles, or other factors distinguishing one company from another. As an example, a Software Industry may include various companies specializing or focusing in distinct areas, or combinations of areas, such as operating systems, enterprise applications, services, desktop or office applications, development tools, video games, among many others. In another example, a Semiconductor Industry may include various companies specializing or focusing in analog integrated circuits, digital integrated circuits, microprocessors, and digital signal processors, among many others. By recognizing that issues related to a security's profitability, overhead, supply chain, capital expenditure, consumer demand, etc. may depend on overlapping factors, and that a security analyst may be likely to exploit this overlap when making predictions, identifying peer securities based on degrees of overlap in analyst coverage may be very useful when conducting financial research, among other things.

According to some aspects of the invention, a set of peer securities may be automatically generated for a primary security based on a degree of analyst coverage overlap. For example, analysts having active estimates and/or recommendations for a primary security may be identified, and for each identified analyst, other securities for which the analyst has an active estimate and/or recommendation may be determined. A set of candidate peer securities may be generated that includes the one or more additional securities.

According to some aspects of the invention, a predetermined number of candidate peer securities may be designated as peer securities based on a degree of analyst coverage overlap. When the candidate peer securities have identical overlap, ties may be broken based on predetermined criteria, such as market capitalization or other criteria. The predetermined number of candidate peer securities designated peer securities may be based on a ranking assigned to each candidate peer security. The ranking may be based on a degree of analyst coverage overlap, such as a number, a percentage, a ratio, or other criteria which measures the degree of overlap among analysts covering both the primary security and the candidate peer security.

According to some aspects of the invention, a user may customize criteria used to generate a set of peer securities. A set of candidate peer securities may be generated automatically based on a degree of analyst coverage overlap and/or the user may customize the generated set of peer securities according to various criteria. For example, a user may trade, invest, or conduct research on a limited number of exchanges, and the set of peer securities may be customized by excluding those securities in the set of candidate peer securities that are not traded on the exchanges associated with the user. In another example, a user may customize the generated set of peer securities by selecting one or more of the candidate peer securities for inclusion in the set of peer securities (e.g., by selecting or de-selecting a check-box or other graphical selection object). In some implementations, the generated set of candidate peer securities may be filtered and/or augmented according to various criteria (e.g., according to a sector and/or industry classification of the primary security). For example, the generated set of candidate peer securities may be augmented to provide a user with additional candidate peer security options, or for other purposes, when a number of candidate peer securities is below is a predetermined threshold, or in other cases. In another example, a user may customize the set of peer securities by manually inputting a ticker symbol, setting filtering criteria (e.g., excluding candidate peer securities that fail to satisfy the filtering criteria), or according to other techniques.

According to some aspects of the invention, sets of peer securities may be stored, analyzed, and/or displayed for use in comparative analysis, for example. A primary security may have multiple sets of peer securities, allowing data to be compiled, collated, aggregated, and otherwise analyzed in various ways. Market capitalizations, price to earnings ratios, asset turnover, correlations in price changes, or other information may be stored, analyzed, and/or displayed for various one or more primary securities, sets of peer securities, or other combinations thereof, and data for the one or more primary securities, sets of peer securities, or other combinations may be analyzed, processed, compared, etc. in many ways. For example, data may be analyzed across one or more peer sets for a primary security (e.g., to research various useful metrics for the primary security). In another example, relationships between primary securities and their candidate peers may be analyzed to partition the primary securities into a classification system. For example, the relationships may be analyzed using clustering techniques to form one or more clusters, and each security may be mapped to one of the clusters.

Other objects and advantages of the invention will be apparent to those skilled in the art based on the following drawings and detailed description.

BRIEF DESCRIPTION OF THE DRAWINGS

FIG. 1 is an exemplary view of an existing third-party classification scheme.

FIG. 2 is an exemplary view of a list of comparable securities based on an existing third-party classification scheme.

FIGS. 5a-d are views of exemplary comparable analysis applications.

DETAILED DESCRIPTION

Figure 3:
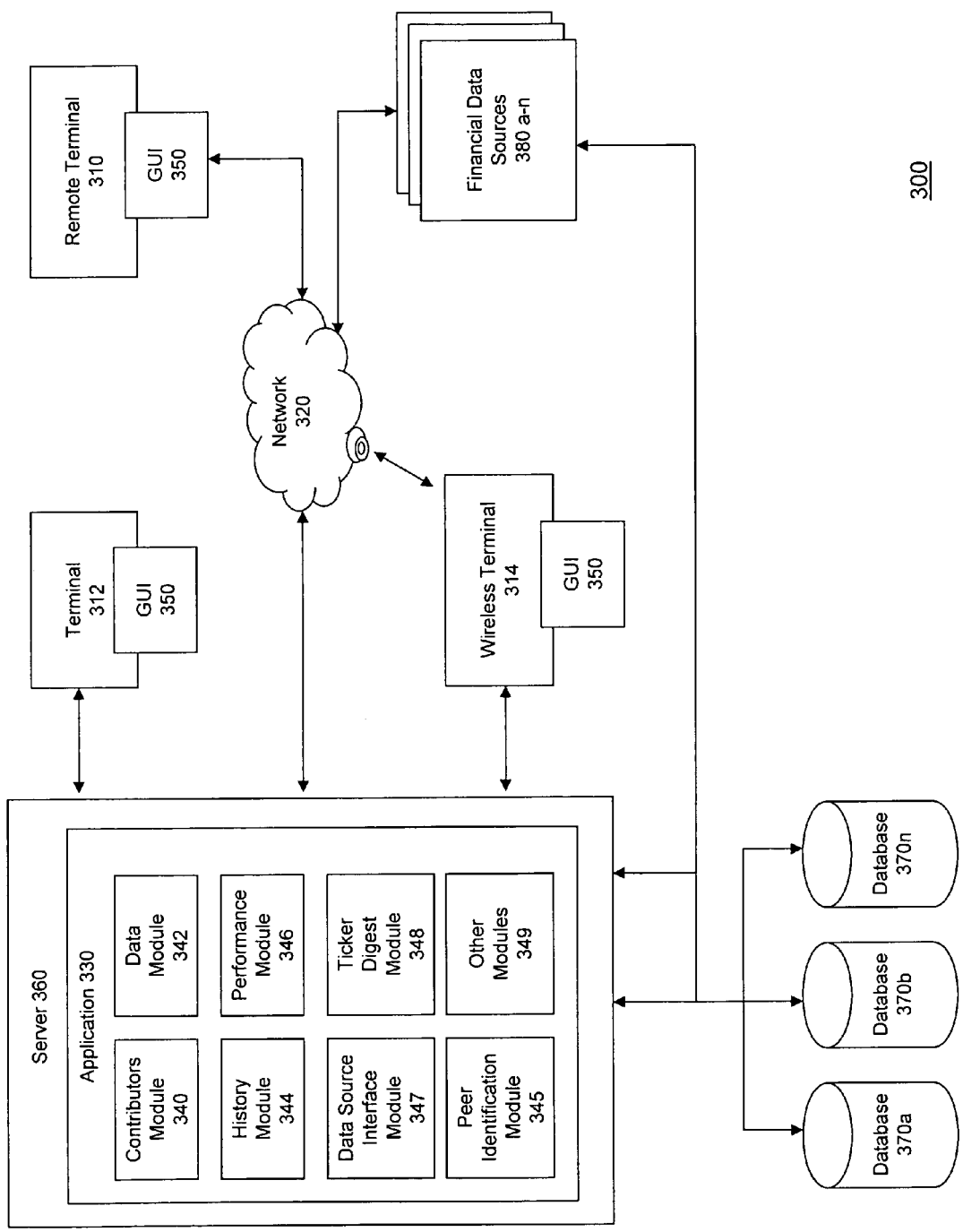
FIG. 3 is a schematic diagram of an exemplary system for facilitating the identification of peer securities.

According to various aspects of the invention, as illustrated in FIG. 3, for example, a system 300 may help investors (or other users) to efficiently and intelligently use analyst data (e.g., security analysts) to identify peer securities relative to a primary security. The identification of peer securities may be based, at least in part, on degrees of overlap in analyst coverage. The identified peer securities may be used for, among other things, comparing data for similar securities, creating a classification system for a set or sets of securities, aggregating and generating comparisons from data across multiple peer sets for a primary security, or many other security research tasks.

By using degrees of overlap in analyst coverage to identify sets of peer securities, the invention overcomes drawbacks of existing systems by identifying peers as related because analysts tend to specialize or focus research in particular areas. Whereas a broad sector or industry may contain hundreds of securities, an analyst may only cover a relatively small number of securities (e.g., on an order of ten to twelve securities), and therefore the analyst may become a specialist in a particular set of securities. Analysts may tend to look at similar factors from one covered security to another, and therefore the invention utilizes degrees of overlap in analyst specialties (coverage) to identify a set of peer securities for a primary security.

For example, within a single Sector or Industry, there may be many different sub-Industries, business models, product lines, market roles, or other factors distinguishing one company from another. As an example, a Software Industry may include various companies specializing or focusing in distinct areas, or combinations of areas, such as operating systems, enterprise applications, services, desktop or office applications, development tools, video games, among many others. In another example, a Semiconductor Industry may include various companies specializing or focusing in analog integrated circuits, digital integrated circuits, microprocessors, and digital signal processors, among many others. By recognizing that issues related to a security's profitability, overhead, supply chain, capital expenditure, consumer demand, etc. may depend on overlapping factors, and that a security analyst may be likely to exploit this overlap when making predictions, identifying peer securities based on degrees of overlap in analyst coverage may be very useful when conducting financial research, among other things.

According to some aspects of the invention, system 300 may include a server 360 that hosts an application 330. Application 330 may comprise an Internet web site, an intranet site, or other host site or application maintained by a service provider, or other entity. Investors, analysts, or other users may perform various tasks related to researching or analyzing securities by accessing application 330. For example, users may manage, view, and/or otherwise analyze data for one or more peer securities relative to a primary security. Application 330 may comprise a contributors module 340, a data module 342, a history module 344, a performance module 346, a data source interface module 347, a ticker digest module 348, a peer identification and analysis module 345, and/or other modules 349, each of which may implement the various features and functions (as described herein) to identify, select, view, classify, compare, and/or otherwise analyze one or more peer securities relative to a primary security.

Application 330 may be accessed to utilize various features and functions, such as those described in U.S. Pat. No. 6,510,419, entitled "Security Analyst Performance Tracking and Analysis System and Method," filed Apr. 23, 1999; U.S. patent application Ser. No. 09/524,253, entitled "Security Analyst Estimates Performance Viewing System and Method," filed Mar. 13, 2000; U.S. Pat. No. 6,681,211, entitled, "Security Analyst Performance Tracking and Analysis System and Method," filed May 24, 2000; co-pending U.S. patent application Ser. No. 09/722,050, entitled "Security Analyst Estimates Performance Viewing System and Method," filed Nov. 27, 2000; co-pending U.S. patent application Ser. No. 09/775,599, entitled "Security Analyst Performance Tracking and Analysis System and Method," filed Feb. 5, 2001; co-pending U.S. patent application Ser. No. 09/893,460, entitled "Security Analyst Estimates Performance Viewing System and Method," filed Jun. 29, 2001; co-pending U.S. patent application Ser. No. 09/982,838, entitled "Security Analyst Estimates Performance Viewing System and Method," filed Oct. 22, 2001; U.S. patent application Ser. No. 10/118,237, entitled "Security Analyst Performance Tracking and Analysis System and Method," filed Apr. 9, 2002, now abandoned; U.S. Pat. No. 6,983,257, entitled "Security Analyst Performance Tracking and Analysis System and Method," filed Apr. 10, 2002; co-pending U.S. patent application Ser. No. 10/681,286, entitled "System and Method for Facilitating the Selection of Security Analyst Research Reports," filed Oct. 9, 2003; and co-pending U.S. patent application Ser. No. 10/965,720, entitled "System and Method for Analyzing Analyst Recommendations on a Single Stock Basis," filed Oct. 18, 2004, each of which are incorporated herein by reference in their entirety.

In operation, one or more users may access application 330 through an interface, such as a graphical user interface 350 displayed via a terminal 312 or a remote terminal 310, connected to server 360 on a network 320 via a communications link. One or more databases (370a, 370b . . . 370n) may be operatively connected to server 360. Databases (370a, 370b . . . 370n) may store data provided by one or more financial data sources (380a, 380b . . . 380n). Databases (370a, 370b . . . 370n) and/or financial data sources (380a, 380b . . . 380n) may include sources of analyst predictions, research reports, or other data, and may comprise, for example, individual security analysts, institutions (e.g., brokerages), combinations thereof, or other information. Financial data sources (380a, 380b . . . 380n) may further comprise one or more databases (e.g., Institutional Brokers Estimates Service database), an Internet web site, an intranet site, or other host site or application, or any combination thereof, maintained by a Financial Information Services Provider (e.g., Thomson Financial), or other entity. Application 330 may access, receive, store, or otherwise manage data from financial data sources (380a, 380b . . . 380n), or from databases (370a, 370b . . . 370n), via a data source interface module 347. Therefore, peer identification and analysis module 345 may identify one or more peer securities relative to a primary security based, at least in part, on analyst data and other information stored in databases (370a, 370b . . . 370n) and/or financial data sources (380a, 380b . . . 380n).

Figure 4:
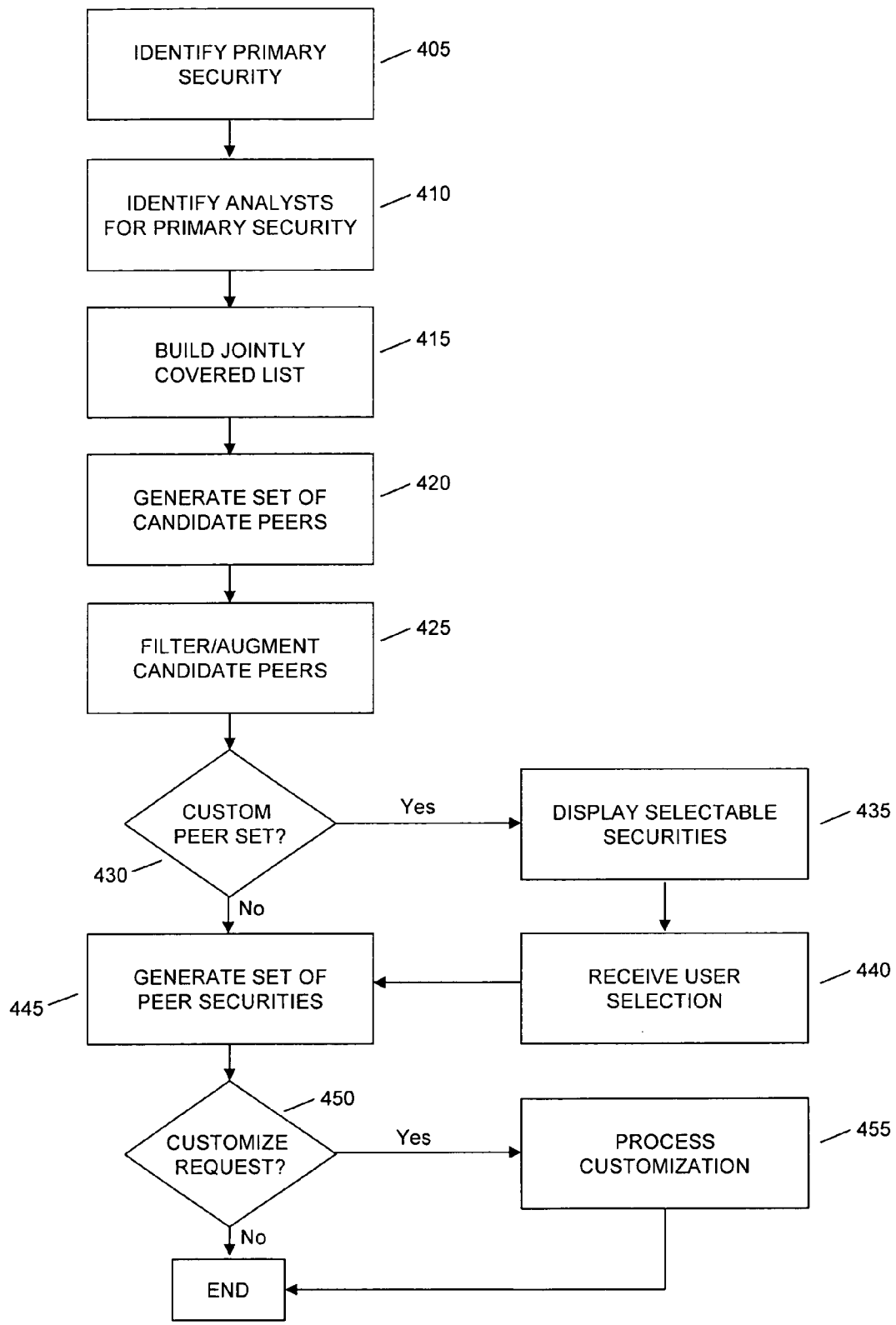
FIG. 4 is a flow diagram of an exemplary method for identifying peers.
Figure 5A:
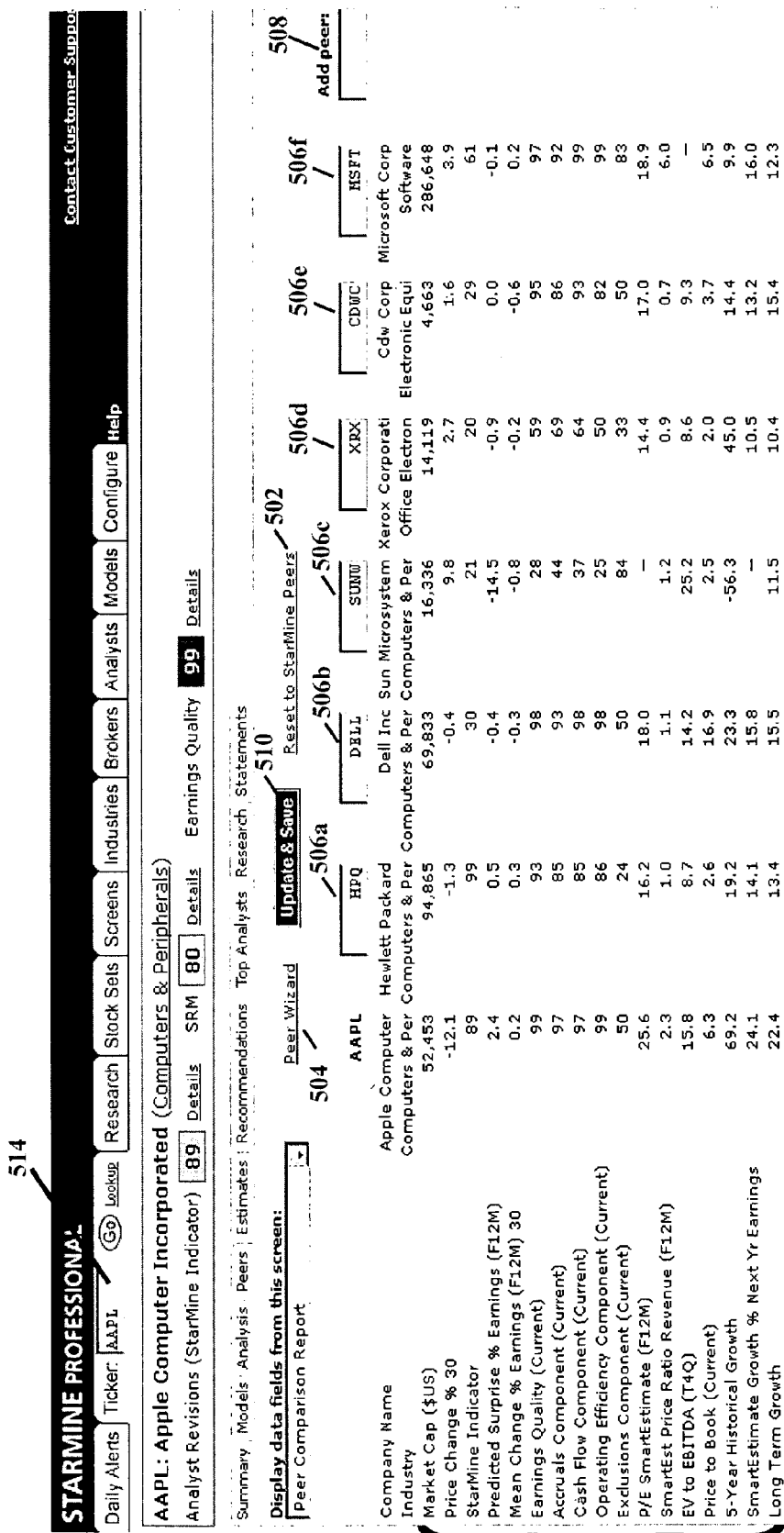

According to some aspects of the invention, as illustrated in FIG. 4, for example, a peer security identification method 400 may identify a set of peer securities relative to a given primary security based, at least in part, on degrees of overlap in broker or financial analyst coverage. For example, two securities may be considered related, and therefore identified as peers, based on criteria associated with analysts that cover the two securities (e.g., based on a number of analysts associated with both a primary security and one or more other securities). A user may identify peer securities, and may compare data for the peer securities to inform investment decision-making, among other uses. In some implementations, peer security identification method 400 may execute automatically at predetermined intervals (e.g., once per week) to generate a system-created set of peer securities for each security in databases 370a-n and/or financial data sources 380a-n. In some implementations, peer security identification method 400 may execute upon a user request to, for example, customize a set of peer securities (e.g., by selecting an peer customization option 504, as shown in FIG. 5a), or reset the customized set of peer securities to the system-created set of peer securities (e.g., by selecting a reset option 502, as shown in FIG. 5a). Those skilled in the art will appreciate that other mechanisms for triggering execution of method 400 may be used without departing from the scope of the invention.

According to some aspects of the invention, peer security identification method 400 may begin in an operation 405, where a primary security may be identified. In some implementations, method 400 may operate at predetermined intervals, and the primary security may be automatically identified by the system. In some implementations, an investor, analyst, or other user may submit a request to identify peers (e.g., by inputting a ticker symbol, selecting a button or other graphical selection object associated with triggering peer identification method 400), and the primary security may be identified based on the request. For example, as shown in FIG. 5a, an investor, analyst, or other user may enter a ticker symbol into a field 514 (or other text entry mechanism) to identify the primary security. Those skilled in the art will appreciate that any suitable technique for identifying a primary security may be used without departing from the scope of the invention.

After identifying the primary security, one or more analysts having active estimates and/or recommendations for the primary security may be identified in an operation 410. For example, security analysts generally provide prediction information for one or more securities, where the prediction information may include earnings estimates, financial estimates, recommendations (e.g., buy, sell, hold, etc.), price targets, or other information for each of the one or more securities. A security analyst tends to cover (i.e., provide prediction information) for a relatively small number of securities, typically on an order of ten to twelve securities. Thus, the security analyst may be considered a specialist for a given set of securities, which may be closely related by industry, sector, business model, product line, or various other characteristics. Moreover, the securities that an analyst covers may vary from time to time (e.g., according to shifts in market trends, a company's business model, etc.), such that analysts having past coverage for the primary security may not necessarily be relevant when identifying current peers for the primary security. Thus, operation 410 may limit the analysts identified for the primary security to those having active estimates, recommendations, or other prediction information for the primary security, thereby generating a list of analysts with specialized knowledge or experience of the primary security.

For similar reasons as stated above, the analysts identified in operation 410 may also be considered specialists for one or more other covered securities. For example, among other factors, analysts tend to conduct a large amount of research when compiling predictions for various securities. Thus, analysts tend to cover securities with similar market niches, product models, or other shared characteristics, in order to exploit advantages of overlapping research, knowledge, or other information. For example, an analyst covering AAPL, which primarily develops and markets consumer electronics and related products, may be unlikely to cover Chevron Corp. (CVX), which primarily develops and markets oil and gasoline products. Instead, an AAPL analyst is more likely to cover securities which develop and market consumer electronics and related products in similar market niches to AAPL, such as Hewlett-Packard Co. (HPQ) or Dell Computer, Inc. (DELL). Thus, in an operation 415, additional securities (other than the primary security) covered by the analysts (as identified in operation 410) may be identified, and included in a list of jointly covered securities. That is, for each jointly covered security, at least one analyst having an active estimate or recommendation for the jointly covered security also has an active estimate or recommendation for the primary security.

The list of jointly covered securities may be analyzed in an operation 420 in order to generate a set of candidate peer securities based on overlapping analyst coverage. Operation 420 may assign a ranking variable to each security in the jointly covered list based on a degree of analyst coverage overlap, and a jointly covered security may be included in the set of candidate peer securities when its ranking variable exceeds a predetermined threshold. Jointly covered securities where the degree of overlap is relatively low may be excluded from the set of candidate peer securities because, in those instances, joint coverage may be based on factors unrelated to common characteristics, such as a random assignment by a brokerage house, random variations in analyst knowledge, or other factors. In contrast, when a degree of overlap for a jointly covered security is relatively higher, the joint coverage is more likely to be based on characteristics that are common to the primary security and the jointly covered security, such as being market competitors or partners, being in related market niches, or other factors.

In some implementations, the ranking variable for a jointly covered security may be a total number of analysts having active estimates or recommendations for both the primary security and the jointly covered security. The jointly covered securities may be sorted according to the ranking variable, and the jointly covered securities having a ranking variable of one may be excluded from the set of candidate peer securities. That is, when only one analyst covering a jointly covered security also covers the primary security, that security may be excluded from the set of candidate peer securities (i.e., each candidate peer security is covered by at least two analysts who also cover the primary security). For example, as shown in FIG. 5b, a primary security 516 may be AAPL, which may be covered by twenty-five analysts. Other securities covered by the twenty-five analysts (i.e., jointly covered securities) may HPQ, DELL, Sun Microsystems Inc. (SUNW), Lexmark International Inc. (LXK), etc. Each jointly covered security may be assigned a ranking variable based on a number of AAPL analysts that also cover the jointly covered security (i.e., a coverage overlap number 518). Thus, the list of candidate peer securities may be limited to those jointly covered securities having a coverage overlap number 518 of two or greater.

In some implementations, the ranking variable for a jointly covered security may be based on a ratio, or percentage, of joint coverage. For example, in some instances, securities may be closely related as peers, yet a ranking variable based on a total number of joint analysts may be suboptimal because of disparities in coverage volume. For example, as shown in FIG. 5c, a primary security 528 of Peet's Coffee and Tea Inc. (PEET) may be actively covered by seven analysts. A ranking variable 532 based on a total number of joint analysts, as described above, may reveal that Starbucks Corp. (SBUX) is PEET's highest ranking candidate peer 532, as four of the seven PEET analysts may also be SBUX analysts. Correlatively, PEET may be considered a candidate peer of SBUX, as a majority of PEET analysts are SBUX analysts. However, when identifying candidate peers of the primary security SBUX 534 (as shown in FIG. 5d), a ranking variable 538 based on a total number of joint analysts may identify PEET as a relatively low ranking candidate peer 536 of SBUX, while identifying Cheesecake Factory Inc. (CAKE) as a relatively high ranking candidate peer. The relatively low ranking may be based on factors other than overlapping coverage, however, such as PEET being a smaller company than SBUX and CAKE (e.g., SBUX may have a market capitalization of $27.695 billion and CAKE may have a market capitalization of $2.892 billion, as compared to PEET having a market capitalization of $407 million, and therefore more analysts cover SBUX and CAKE than cover PEET).

Thus, the ranking variable may optionally be based on a ratio, or percentage, of joint coverage, which may be obtained by dividing a total number of joint analysts for a jointly covered security by a total number of analysts for the jointly covered security (i.e., the ranking variable may be a percentage of a jointly covered security's analysts who are also analysts for the primary security). Thus, in the example of PEET, SBUX, and CAKE, the ranking variable for PEET may be obtained by dividing the number of joint PEET/SBUX analysts (i.e., four) by the total number of PEET analysts (seven), yielding a ranking ratio of 0.571 (or percentage of 57.1%), and a similar calculation (e.g., twelve divided by twenty-two) may yield a ranking variable of 0.545 (or 54.5%) for CAKE, thereby ranking PEET higher than CAKE when ranking according to ratio (or percentage). Those jointly covered securities having a ranking ratio (or percentage) below a predetermined threshold may be excluded from the set of candidate peer securities. For example, when the ratio for a security is less than 0.25 (or the percentage is less than 25%), the security may be excluded from the set of candidate peers. Those skilled in the art will appreciate that various techniques may be used to generate the ranking variable, including combinations of methods described above.

In some implementations, when ranking variables for two or more jointly covered securities are identical, ties may be broken according to various predetermined criteria. For example, as shown in FIG. 5b, when two or more jointly covered securities share identical coverage overlap values 518, ties may be broken according to market capitalization 520. For example, CDWC, Western Digital Corp. (WDC), Ingram Micro (IM), and Tech Data Corp. (TECD) may each be covered by five analysts that are also AAPL analysts. Thus, this tie may be broken by ranking CDWC first (market capitalization of $4.663 billion), WDC second (market capitalization of $4.165 billion), IM third (market capitalization of $3.207 billion), and TECD fourth (market capitalization of $2.009 billion) within the jointly covered securities having overlap values of five. Those skilled in the art will appreciate that other methods may be used to break ties, such as analyzing one or more criteria, or a combination thereof.

After the set of candidate peer securities has been identified in operation 420, the set of candidate peer securities may be augmented and/or filtered in an operation 425. For example, For example, a system may be configured to provide the user with a predetermined minimum number of candidate peer securities from which to select peer securities, Thus, when a number of candidate peer securities is below the predetermined number, the set of candidate peer securities may be augmented according to various criteria (e.g., inclusion in a predetermined classification system). In another example, a user may elect to override one or more system generated peer securities, include additional candidate peer securities in the set of peer securities, add filtering criteria to determine specific types of peer securities, or make other customizations. In such cases, the set of candidate peer securities may be filtered and/or augmented in operation 425. For example, operation 425 may include augmenting the set of candidate peers by including any additional securities that are similarly classified with the primary security (e.g., if the number of candidate peers for AAPL is below the minimum number, the candidate peers may be augmented with any additional securities classified in "Information Technology→Computers & Peripherals"). Those skilled in the art will appreciate that other techniques for augmenting the set of candidate peers may be used without departing from the scope of the invention.

Operation 425 may also include filtering the set of candidate peer securities, or the augmented set of candidate peer securities, according to various criteria. For example, an investor, analyst, or other user may be associated with a limited number of exchanges (e.g., an investor may only trade on exchanges in the United States), and any candidate peer securities that are not traded on those exchanges may be excluded. In another example, various criteria may be provided, and the candidate peer securities may be filtered according to the provided criteria. For example, if criteria specifies that a candidate peer security must have a similar market capitalization to the primary security, a ratio of market capitalization for candidate peers identified in operation 420 to market capitalization for the primary security may be calculated, and those candidate peers having a ratio falling outside a defined range may be excluded (e.g., the ratio must be between 0.1 and 10.0). Those skilled in the art will appreciate that candidate peer securities may be filtered according to various different criteria, including market capitalization, profit margin, asset turnover, growth rate, rate of return, or other criteria, or a combination thereof, and operation 425 may filter the candidate peer securities accordingly.

Processing then proceeds to an operation 430, where it may be determined whether the set of peer securities being generated is a user customized set of peers. In some implementations, a user may select an option 502 (as shown in FIG. 5a) to reset a set of peer securities to a system generated set of peer securities, in which case a system generated set of peer securities may be created in an operation 445. In some implementations, method 400 may be automatically executed at predetermined intervals (as described above), in which case processing proceeds to operation 445. In such cases where the peer securities are not user-customized, a set of peer securities may be generated in operation 445. For example, a predetermined number of highest ranking candidate peer securities may be designated peer securities in operation 445, or other criteria may be used.

In some implementations, a user may select an option 504 (as shown in FIG. 5a) to customize a set of peer securities for a primary security, in which case processing may proceed to an operation 435, where a set of selectable candidate peer securities may be displayed for user selection. For example, as shown in FIG. 5a, a selectable set of candidate peer securities may each be associated with an option 523 to be included in a set of peer securities, where a user may select one or more securities for inclusion in the set of peer securities by selecting a check-box (or other graphical selection object) 522 associated with the respective securities. Alternatively, the user may deselect one or more securities, excluding the securities from the set of peer securities, by de-selecting the check-box (or other graphical selection object) 522 associated with the respective securities. After the user has completed one or more selections and/or de-selections, the user may elect to update and/or save the set of peer securities by selecting an option 524, and the selections and/or de-selections may be processed in an operation 440.

Processing then proceeds to operation 445 where the set of candidate peer securities may be stored and associated with the primary security for subsequent use. For example, the peer securities may be used as part of a comparative analysis application, where data for the primary security and corresponding data for the peer securities may be displayed for an investor, analyst, or other user. For example, as shown in FIG. 5a, a set of peer securities 506a-f for AAPL may include HPQ 506a, DELL 506b, SUNW 506c, XRX 506d, CDWC 506e, and MSFT 506f, and data 512 for AAPL and corresponding data for the peer securities 506a-f may be displayed. If an investor, analyst, or other user is satisfied with the set of peer securities, or otherwise elects not to further customize the set of peer securities, a decisional operation 450 may end the peer identification method. However, the user may further customize the set of peer securities, and the customization may be processed in an operation 455. For example, a user may overwrite one or more of peer securities 506a-f by entering a ticker symbol into a corresponding text box or other graphical entry object. In another example, the user may add a security to the set of peer securities by entering a ticker symbol into a text box 508 or other graphical entry object. In another example, a user may select an option 504, which may guide the user through selecting peers (e.g., in a similar manner as described in operations 430-440). Those skilled in the art will recognize that other ways of customizing the set of peer securities may be used without departing from the scope of the invention.

Those skilled in the art will recognize additional functions and features that may be enabled by identifying peer (or candidate peer) securities based on degrees of coverage overlap. For example, in some implementations, a set of candidate peer securities may be determined for each security in databases 370a-n and/or financial data sources 380a-n. The candidate peer securities may be identified using one or more (or a combination) of techniques described above. All security-candidate peer security combinations may then be analyzed using clustering techniques, such as those described in the aforementioned patents and/or patent applications. The clustering techniques may analyze the security-candidate peer security combinations to create one or more partitions, and each security may be assigned to one of the partitions. Thus, the peer identification method according to the invention may be used to reengineer a process for classifying stocks. In some implementations, a primary security may be associated with two or more sets of peer securities, and investors, analysts, or other users may compare data across peer sets, within peer sets, across an aggregation of peer sets, or according to other permutations. For example, various techniques for analyzing data may be used in various ways, such as described in the aforementioned patents and/or patent applications, including but not limited to generating comparisons, screening tools, models, reports, digests, or other analyses.

As described above, a system 300 for identifying peer securities relative to a primary security may be varied in many ways. By way of example, server 360 may comprise a web server, workstation, or other device executing Microsoft Windows NT, Microsoft Windows 2000, Unix, Linux, Xenix, IBM, AIX, Hewlett-Packard UX, Novell Netware, Sun Microsystems Solaris, OS/2, BeOS, Mach, Apache, OpenStep, or any other suitable operating system or platform. Those skilled in the art will recognize that other client/server and network configurations may be used. Graphical user interface 350 may be displayed via a personal computer, workstation, dumb terminal, or other user terminal networked to server 360. In addition, users may also access server 360 through a wireless terminal 314, such as a portable computer, personal digital assistant, wireless phone, web-enabled mobile phone, Wireless Access Point device, web-to-voice device, or other wireless device. Network 320 may include any one or more of, for instance, the Internet, an intranet, a Personal Area Network, a Local Area Network, a Wide Area Network, a Storage Area Network, or a Metropolitan Area Network. Any suitable communications link may be utilized, including any one or more of, for instance, a copper telephone line, a Digital Subscriber Line connection, a Digital Data Service connection, an Ethernet connection, an Integrated Services Digital Network line, an analog modem connection, a cable modem connection, or other connection. Databases (370a, 370b . . . 370n) may be, include, or interface to, for example, an Oracle™ relational database sold commercially by Oracle Corporation. Other databases, such as Informix™m, DB2 (Database 2) or other data storage or query formats, platforms, or resources such as On Line Analytical Processing, Standard Query Language, a Storage Area Network, Microsoft Access™, or others, may also be used, incorporated, or accessed into the invention. Financial data sources (380a, 380b . . . 380n) and/or databases (370a, 370b . . . 370n) may be directly networked to server 360, or operatively connected to server 360 through network 320. As an illustrative example, data source interface module 347 may access data via an Application Program Interface or File Transfer Protocol site provided by a particular financial data source (e.g., 380a). Those skilled in the art will appreciate that the invention described herein may work with various system configurations. Accordingly, more or less of the aforementioned system components may be used and/or combined in various implementations.

Graphical user interface 350, and the various features, functions, characteristics, and appearances described therein may differ in appearance, content, and configuration. Further, graphical user interface 350a may use any suitable combination of buttons, pull-down or drop-down menus, tabs, click-boxes, check-boxes, hypertext links, hot links, or other graphical selection objects, which may comprise any known navigational tool that enables users to select, access, display, or navigate through the various views, portions, or modules of application 330. The selection portions may be accessed using any known input device, such as, for example, a keyboard, computer mouse, light stylus instrument, or finger or other body part in a touch-screen implementation. While a selection portion may be described and illustrated as a button in some implementations, it could comprise a different selection portion (e.g., a check-box) in some implementations. These selection portions may be present in addition to the various navigational tools that may be unique to, or associated with, a web browser (e.g., Netscape™) or other graphical user interface 350 used to access application 330.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, instructions, etc.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A computer-implemented method for automatically identifying peer securities for a first security based on a degree of analyst coverage overlap, the method comprising:
   identifying, on a server computer, one or more analysts that cover the first security;
   determining, on the server computer, any other securities that at least one of the identified analysts cover in addition to the first security;
   generating, on the server computer, a set of candidate peer securities for the first security, wherein the set of candidate peer securities include each of the other securities that at least one of the identified analysts cover in addition to the first security;
   determining, on the server computer, the degree of analyst coverage overlap for each of the other securities in the set of candidate peer securities, wherein the degree of analyst coverage overlap for each respective other security in the set of candidate peer securities is based on a number of the identified analysts that cover the respective other security;
   determining, on the server computer, a set of peer securities for the first security based on the degree of analyst coverage overlap determined for each of the other securities in the set of candidate peer securities, wherein the set of peer securities includes a subset of the other securities in the set of candidate peer securities; and
   storing the set of peer securities determined for the first security in a database coupled to the server computer.

2. The method of claim 1, wherein the one or more analysts that cover the first security are identified in response to the analysts having an active estimate or an active recommendation for the first security, and wherein the other securities are determined in response to at least one of the identified analysts having an active estimate or an active recommendation for the other securities.

3. The method of claim 1, further comprising transmitting information relating to the set of peer securities to enable displaying of the information relating to the set of peer securities.

4. The method of claim 3, wherein the information relating to the set of peer securities includes the degree of analyst coverage overlap determined for each of the other securities in the subset of the other securities in the set of candidate peer securities.

5. The method of claim 1, wherein determining the set of peer securities for the first security includes assigning a ranking to each respective other security in the set of candidate peer securities based on the number of the identified analysts that cover the respective other security.

6. The method of claim 5, wherein the subset of the other securities in the set of candidate peer securities includes the other securities in the set of candidate peer securities that have a ranking that exceeds a predetermined threshold.

7. The method of claim 5, wherein the ranking assigned to each respective other security in the set of candidate peer securities is the number of the identified analysts that cover the respective other security in addition to the first security.

8. The method of claim 5, wherein the ranking assigned to each respective other security in the set of the candidate peer securities is a ratio of the number of the identified analysts that cover the respective other security in addition to the first security relative to a total number of analysts that cover the respective other security.

9. The method of claim 5, further comprising breaking a tie between two or more of the other securities in the set of candidate peer securities in response to the two or more of the other securities having an identical ranking, wherein the tie is broken based on one or more criteria associated with the two or more of the other securities that have the identical ranking.

10. The method of claim 9, wherein the criteria for breaking the tie includes market capitalizations associated with the two or more of the other securities that have the identical ranking.

11. The method of claim 1, further comprising augmenting the other securities in the set of candidate peer securities generated for the first security in response to a number of the other securities in the set of candidate peer securities being below a predetermined threshold.

12. The method of claim 11, wherein augmenting the other securities in the set of candidate peer securities includes adding at least one security that shares a classification with the first security to the set of candidate peer securities.

13. A computer-implemented method for creating a user-customized set of peer securities for a first security based on a degree of analyst coverage overlap, the method comprising:
   identifying, on a server computer, one or more analysts that cover the first security;
   determining, on the server computer, any other securities that at least one of the identified analysts cover in addition to the first security;
   generating, on the server computer, a set of candidate peer securities for the first security, wherein the set of candidate peer securities include each of the other securities that at least one of the identified analysts cover in addition to the first security;

determining, on the server computer, the degree of analyst coverage overlap for each of the other securities in the set of candidate peer securities, wherein the degree of analyst coverage overlap for each respective other security in the set of candidate peer securities is based on a number of the identified analysts that cover the respective other security;

transmitting information relating to the set of candidate peer securities;

receiving, on the server computer, a selection of one or more of the other securities in the set of candidate peer securities in response to the transmission of the information relating to the set of candidate peer securities;

determining, on the server computer, a set of peer securities for the first security in response to the selection, wherein the set of peer securities includes the one or more selected other securities in the set of candidate peer securities; and storing the set of peer securities determined for the first security in a database coupled to the server computer.

14. The method of claim 13, further comprising augmenting the other securities in the set of candidate peer securities generated for the first security in response to a number of the other securities in the set of candidate peer securities being below a predetermined threshold.

15. The method of claim 14, wherein augmenting the other securities in the set of candidate peer securities includes adding at least one security that shares a classification with the first security to the set of candidate peer securities.

16. The method of claim 13, further comprising transmitting information relating to the set of peer securities, wherein transmitting the information relating to the set of candidate peer securities and the information relating to the set of peer securities enables displaying of the information relating to the set of candidate peer securities and the set of peer securities.

17. A computer-implemented method for classifying securities based on a degree of analyst coverage overlap, the method comprising:

generating a set of candidate peer securities for each of a plurality of securities to be classified, wherein generating the set of candidate peer securities for each respective security in the plurality of securities to be classified includes:

identifying, on a server computer, one or more analysts that cover the respective security in the plurality of securities to be classified;

determining, on the server computer, any other securities that at least one of the identified analysts cover in addition to the respective security;

generating, on the server computer, the set of candidate peer securities for the respective security, wherein the set of candidate peer securities generated for the respective security includes each of the other securities that at least one of the identified analysts cover in addition to the respective security; and determining, on the server computer, the degree of analyst coverage overlap for each of the other securities in the set of candidate peer securities generated for the respective security, wherein the degree of analyst coverage overlap for each respective other security in the set of candidate peer securities is based on a number of the identified analysts that cover the respective other security;

analyzing, on the server computer, the set of candidate peer securities generated for each of the plurality of securities to be classified to create a plurality of clusters, wherein the plurality of clusters are created based on the degree of analyst coverage overlap determined for each of the other securities in the set of candidate peer securities generated for each of the plurality of securities to be classified;

classifying, on the server computer, each of the plurality of securities to be classified within one of the plurality of clusters; and storing the classification for each of the plurality of securities in association with a classification system in a database coupled to the server computer.

18. A computer-implemented system for automatically identifying peer securities for a first security based on a degree of analyst coverage overlap, the system comprising one or more processing devices collectively configured to:

identify, on a server computer, one or more analysts that cover the first security;

determine, on the server computer, any other securities that at least one of the identified analysts cover in addition to the first security;

generate, on the server computer, a set of candidate peer securities for the first security, wherein the set of candidate peer securities include each of the other securities that at least one of the identified analysts cover in addition to the first security;

determine, on the server computer, the degree of analyst coverage overlap for each of the other securities in the set of candidate peer securities, wherein the degree of analyst coverage overlap for each respective other security in the set of candidate peer securities is based on a number of the identified analysts that cover the respective other security;

determine, on the server computer, a set of peer securities for the first security based on the degree of analyst coverage overlap determined for each of the other securities in the set of candidate peer securities, wherein the set of peer securities includes a subset of the other securities in the set of candidate peer securities; and store the set of peer securities determined for the first security in a database coupled to the server computer.

19. The system of claim 18, wherein the one or more analysts that cover the first security are identified in response to the analysts having an active estimate or an active recommendation for the first security, and wherein the other securities are determined in response to at least one of the identified analysts having an active estimate or an active recommendation for the other securities.

20. The system of claim 18, wherein the one or more processing devices are further configured to transmit information relating to the set of peer securities to enable a display of the information relating to the set of peer securities.

21. The system of claim 20, wherein the information relating to the set of peer securities includes the degree of analyst coverage overlap determined for each of the other securities in the subset of the other securities in the set of candidate peer securities.

22. The system of claim 18, wherein the one or more processing devices configured to determine the set of peer securities for the first security are further configured to assign a ranking to each respective other security in the set of candidate peer securities based on the number of the identified analysts that cover the respective other security.

23. The system of claim 22, wherein the subset of the other securities in the set of candidate peer securities includes the other securities in the set of candidate peer securities that have a ranking that exceeds a predetermined threshold.

24. The system of claim 22, wherein the ranking assigned to each respective other security in the set of candidate peer securities is the number of the identified analysts that cover the respective other security in addition to the first security.

25. The system of claim 22, wherein the ranking assigned to each respective other security in the set of the candidate peer securities is a ratio of the number of the identified analysts that cover the respective other security in addition to the first security relative to a total number of analysts that cover the respective other security.

26. The system of claim 22, wherein the one or more processing devices are further configured to break a tie between two or more of the other securities in the set of candidate peer securities in response to the two or more of the other securities having an identical ranking, wherein the tie is broken based on one or more criteria associated with the two or more of the other securities that have the identical ranking.

27. The system of claim 26, wherein the criteria for breaking the tie includes market capitalizations associated with the two or more of the other securities that have the identical ranking.

28. The system of claim 18, wherein the one or more processing devices are further configured to augment the other securities in the set of candidate peer securities generated for the first security in response to a number of the other securities in the set of candidate peer securities being below a predetermined threshold.

29. The system of claim 28, wherein the one or more processing devices configured to augment the other securities in the set of candidate peer securities are further configured to add at least one security that shares a classification with the first security to the set of candidate peer securities.

30. A computer-implemented system for creating a user-customized set of peer securities for a first security based on a degree of analyst coverage overlap, the system comprising one or more processing devices collectively configured to:
- identify, on a server computer, one or more analysts that cover the first security;
- determine, on the server computer, any other securities that at least one of the identified analysts cover in addition to the first security;
- generate, on the server computer, a set of candidate peer securities for the first security, wherein the set of candidate peer securities include each of the other securities that at least one of the identified analysts cover in addition to the first security;
- determine, on the server computer, the degree of analyst coverage overlap for each of the other securities in the set of candidate peer securities, wherein the degree of analyst coverage overlap for each respective other security in the set of candidate peer securities is based on a number of the identified analysts that cover the respective other security;
- transmit information relating to the set of candidate peer securities;
- receive, on the server computer, a selection of one or more of the other securities in the set of candidate peer securities in response to the transmission of the information relating to the set of candidate peer securities;
- determine, on the server computer, a set of peer securities for the first security in response to the selection, wherein the set of peer securities includes the one or more selected other securities in the set of candidate peer securities; and
- storing the set of peer securities determined for the first security in a database coupled to the server computer.

31. The system of claim 30, wherein the one or more processing devices are further configured to augment the other securities in the set of candidate peer securities generated for the first security in response to a number of the other securities in the set of candidate peer securities being below a predetermined threshold.

32. The system of claim 31, wherein the one or more processing devices configured to augment the other securities in the set of candidate peer securities are further configured to add at least one security that shares a classification with the first security to the set of candidate peer securities.

33. The system of claim 30, wherein the one or more processing devices are further configured to transmit information relating to the set of peer securities, wherein transmitting the information relating to the set of candidate peer securities and the information relating to the set of peer securities enables a display of the information relating to the set of candidate peer securities and the set of peer securities.

34. A computer-implemented system for classifying securities based on a degree of analyst coverage overlap, the system comprising one or more processing devices collectively configured to:
- generate a set of candidate peer securities for each of a plurality of securities to be classified, wherein a server computer that generates the set of candidate peer securities for each respective security in the plurality of securities to be classified is configured to:
  - identify one or more analysts that cover the respective security in the plurality of securities to be classified;
  - determine any other securities that at least one of the identified analysts cover in addition to the respective security;
  - generate the set of candidate peer securities for the respective security, wherein the set of candidate peer securities generated for the respective security includes each of the other securities that at least one of the identified analysts cover in addition to the respective security; and
  - determine the degree of analyst coverage overlap for each of the other securities in the set of candidate peer securities generated for the respective security, wherein the degree of analyst coverage overlap for each respective other security in the set of candidate peer securities is based on a number of the identified analysts that cover the respective other security;
- analyze, on the server computer, the set of candidate peer securities generated for each of the plurality of securities to be classified to create a plurality of clusters, wherein the plurality of clusters are created based on the degree of analyst coverage overlap determined for each of the other securities in the set of candidate peer securities generated for each of the plurality of securities to be classified;
- classify, on the server computer, each of the plurality of securities to be classified within one of the plurality of clusters; and
- store the classification for each of the plurality, securities in association with a classification system in a database coupled to the server computer.

* * * * *